Oct. 26, 1954  E. A. FIELD  2,692,640
BAROMETRIC DRAFT REGULATOR AND BURNER CONTROL
Filed Dec. 26, 1950
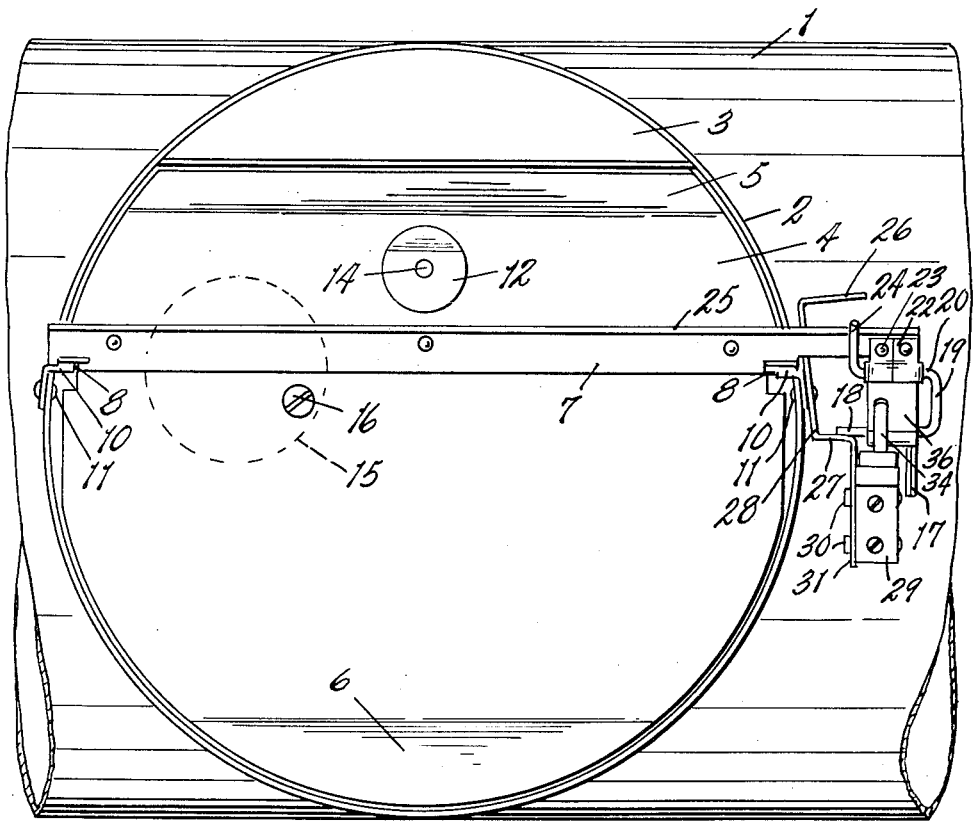
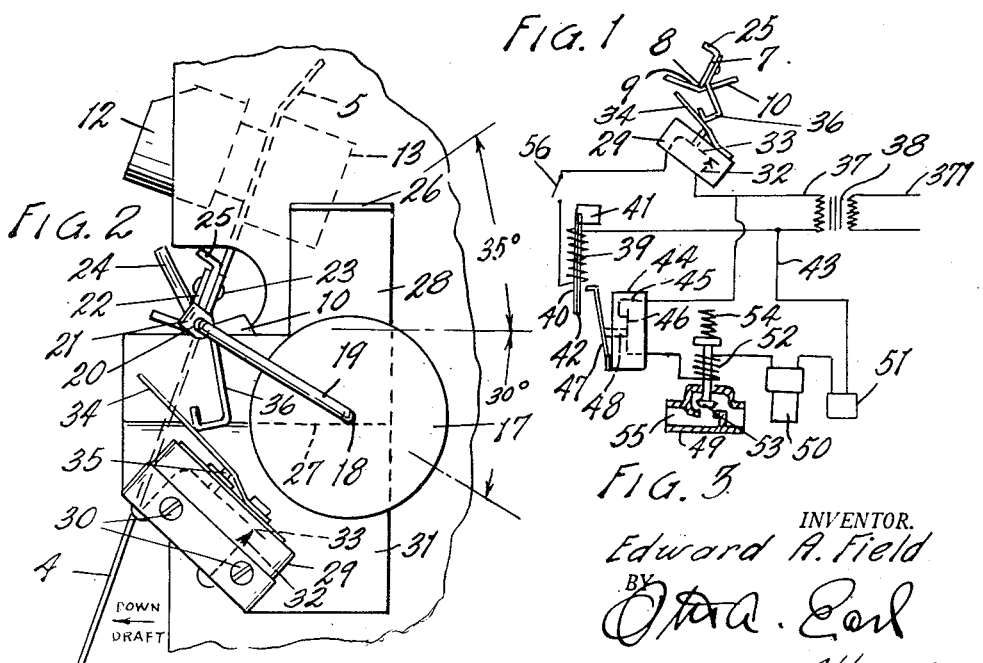
INVENTOR.
Edward A. Field
BY
Otto A. Earl
Attorney.

Patented Oct. 26, 1954

2,692,640

UNITED STATES PATENT OFFICE 2,692,640

BAROMETRIC DRAFT REGULATOR AND BURNER CONTROL

Edward A. Field, Mendota, Ill.

Application December 26, 1950, Serial No. 202,757

8 Claims. (Cl. 158—1)

This invention relates to improvements in barometric draft regulator and burner controls.

The main objects of the invention are:

First, to provide a barometric draft regulator for gas burners for controlling the updrafts and by-passing the downdrafts and electrical means controllable by said regulator and operable, in the event of a downdraft, to close a valve in the gas supply to the burner and to control a pilot safety and thermostat and the like.

Second, to provide a control of the above type, which is delayed in action to operate after a relatively prolonged downdraft, to close the valve in the gas supply to the burner and to control the pilot safety, thermostat and the like.

Third, to provide a draft regulator and control of the above type which may be readily and economically produced and installed and which is highly efficient in use.

Further objects relating to details and economies of the invention will appear from the description to follow. The invention is defined in the claims.

The structure which embodies the features of my invention is illustrated in the accompanying drawing, wherein:

Fig. 1 is an end view of the draft regulator installed on the smoke flue, the view also showing a control switch operable by the regulator for controlling a gas burner.

Fig. 2 is a side elevation of the draft regulator and the control switch operable thereby.

Fig. 3 is a side elevation of the control switch and a diagrammatic illustration of electrical connections between said switch and a gas valve, pilot safety and thermostat.

The present invention relates to an automatic draft regulator for gas burners and to electrical means operable by the regulator for closing the gas valve in the gas supply to the burner and for controlling other means, such as a pilot safety and thermostat. The draft control is of the type particularly adapted for gas burners for controlling both the up and downdrafts and is connected to the electrical control means to operate the same in the event of a downdraft. Since a gas fire can be extinguished rather easily by a downdraft, it is essential, unless the burner has a forced draft, that means be provided to by-pass the downdraft. A downdraft can extinguish the flame or create such combustion conditions that carbon monoxide gas is produced. If this gas escapes into a boiler or furnace room even in rather small quantities, the results can be dangerous. It is the purpose of this invention to provide a draft control which controls the updraft and by-passes the downdraft to prevent the same from extinguishing the gas flame and creating such improper combustion conditions and to provide in connection with such draft control, electrical connections operable thereby for closing the gas valve in the gas supply to the burner should the downdraft continue for a considerable time; for example, several minutes or longer. Such electrical connections may also be used for controlling a pilot safety, thermostat, etc.

Referring to the embodiment of the invention illustrated, 1 designates the smoke flue and 2, a gate housing mounted on the side of the flue. A member 3 in the form of a segment is fixedly secured to the gate housing at the top and adjacent the front thereof. A control gate 4 is pivotally mounted in the gate housing adjacent the front end thereof and beneath the segment 3. The upper part of the gate is cut away so as to swing by the segment both inwardly and outwardly thereof without interference. The upper and lower portions 5 and 6 of the gate are bent inwardly slightly to improve the regulating ability of the unit. Because the gate is pivoted above center, it is desirable that these portions be bent inwardly. An angle member 7 riveted to the front side of the gate and projecting beyond the opposite side edges thereof is provided with knife edges 8 on the lower edges of the projecting end portions. These knife edges engage V-shaped recesses 9 in the supporting brackets 10 fixedly secured by means of rivets or bolts 11 to the opposite sides of the gate housing. This provides means for pivotally supporting the gate within the housing.

Weights 12 and 13 are attached to the gate by means of the screw or threaded rod 14, as is old in the art. In addition, there is a disc 15 eccentrically attached by means of a screw 16 to the back side of the gate as shown in dotted outline in Fig. 1. By means of these weights and the disc it is possible to bring the gate into essentially a static balance, though the center of gravity of the entire assembly is purposely located just a fraction of an inch below the pivot center line provided by the knife edges 8 of the angle member 7. This tends to urge the gate to a vertically closed position.

Weights 17 in the form of washers are supported on the horizontal inwardly bent portion 18 of the lever 19. The lever has a horizontally inwardly projecting portion 20 adjacent the upper end thereof providing a shaft-like member extending through rearwardly extending ears 21 on the bracket member 22 secured by rivets or bolts 23 to one of the projecting ends of the angle member 7. The lever 19 at the inner end of the shaft portion 20 thereof is bent upwardly to provide the short arm 24 disposed for engagement by the horizontal flange 25 extending along the upper edge of the angle member 7 when the gate is in a closed position as shown in Fig. 1. The arm 24 is also engaged by the flange 25 when the lower portion of the gate opens inwardly during an updraft. The lever 19 is loosely supported in the ears 21 to freely swing therein.

Stops 26 and 27 limit the swinging movement of the lever 19. These stops are formed by outwardly bending portions of the bracket 28 secured by means of rivets 11 or other suitable means to the gate housing 2. These stops are disposed in the path of movement of the horizontal arm 18 of the lever 19, the stop 27 limiting downward movement of the lever and the stop 26 limiting upward movement. The upwardly projecting arm 24 of the lever 19 is disposed in the path of movement of the flange 25 of the angle member 7 secured to the gate. The lever with the washers moves with the gate during inward movement of the lower portion of the gate caused by an updraft. The lever moves from its position of angagement with the stop 27 when the gate is closed through an angle of 30° to a horizontal position and then through an angle of 35° to its position of engagement with the stop 26 when the gate is in an inwardly widely opened position. The gate opens inwardly through an angle of 65° from its closed position. The exact draft which the device maintains depends on the number of washers 17 on the lower end of the lever. The weights 12 and 13 are not changed after the unit leaves the factory.

In the event of a downdraft, the lower part of the gate swings outwardly as shown in Fig. 2. The lever 19 and weights 17 then become inoperative in exerting a torque on the gate due to the arm 18 of the lever engaging the stop 27 and due to the flange 25 of the angle member 7 moving rearwardly away from the arm 24 of the lever as shown in Fig. 2. The force which then tends to close the gate is the small force developed because the center of gravity of the gate assembly is located a minute distance below the pivotal axis of the gate as heretofore described.

The construction heretofore specifically described constitutes in its substantial entirety the subject matter of my co-pending application for Barometric Draft Regulator, serial number 187,492 filed September 29, 1950, now Patent Number 2,652,200, granted September 15, 1953.

A switch conventionally shown and designated generally by the numeral 29 is secured by means of bolts 30 to the depending flange 31 bent downwardly from the stop member 27 on the bracket 28. This switch comprises a stationary terminal 32 and a movable terminal in the form of a light spring 33 shown in dotted outline in Fig. 2. A light spring 34 fixedly secured to the switch casing engages the plunger member 35 disposed to engage and operate the movable switch member 33. The plunger 35 of any suitable insulating material is elongated and longitudinally slidable in the switch casing. The spring 34 is disposed in the path of outward movement of an arm 36 fixedly secured by rivets or bolts 23 to the angular member 7. The arm 36 engages the spring 34 and closes the switch when the lower portion of the gate opens outwardly any appreciable amount due to a down draft. The resistance offered by the spring 34 to the outward movement of the arm 36 is so slight as not to appreciably retard free outward movement of the gate due to a down draft.

The switch terminals 32 and 33 are in the circuit 37 of any suitable source of electricity. If connected to a high voltage line circuit 371 a transformer 38 reduces the voltage, as for example from 115 volts to 25 volts. In the circuit 37 is a resistance coil 39 through which projects a bimetal thermostat element 40 to be heated by the coil. One end of the element is fixedly connected to any suitable support 41 and the other end 42 is free to deflect laterally due to unequal expansion of the two metal strips when heated, as is common in thermostats.

A second circuit 43 connected to and disposed in parallelism to the circuit 37 includes a switch conventionally shown and designated generally by the numeral 44. This switch includes a fixed terminal 45 and a movable terminal in the form of a light spring 46 normally engaging under spring pressure the fixed terminal 45. A spring 47 fixedly secured at one end to the switch casing has its other end disposed to be engaged by the end 42 of the bimetal member 40 when deflected laterally due to heat from the coil 39. A plunger member 48 of any suitable insulating material is longitudinally slidably mounted in the switch casing and is disposed in end abutting engagement with the springs 46 and 47 and operated thereby. The spring 47 when deflected laterally by the bimetal member 40 operates through the plunger member 48 to open the switch 44.

Various control means may be disposed in the circuit 43 to be controlled thereby as for example the gas valve control means 49, pilot safety control means 50 and thermostat control means 51. The gas valve control means designated generally by the numeral 49 comprises the solenoid 52 disposed in the circuit 43 and operable to hold the valve 53 open when the switch 44 is closed. A spring 54 closes the valve when the switch 44 is opened. The valve is disposed in the gas supply pipe 55 to the burner, and shuts off the supply of gas to the burner in the event the down draft continues for a considerable time, such as might result in the escape of a considerable monoxide gas into the furnace room.

The operation of the regulator and control is as follows: During a down draft the control gate opens outwardly. If the gate opens outwardly any appreciable distance the arm 36 operated by the gate engages the spring 34 on the switch 29 to thereby close the switch in the circuit 37. The current in the circuit 37 then heats the coil 39. If such down draft continues for some time, for example for a few minutes or longer, or such time as might result in the escape of carbon monoxide into the furnace room in such amount as to be dangerous, the thermostatic element 40 becomes sufficiently heated for the end 42 thereof to be deflected laterally into engagement with the spring 47 and to operate the same to open the switch 44 in the circuit 43. This as above described, closes the gas valve 49 in the gas supply for the burner. When the gate is in a closed position or opens inwardly during an updraft the arm 36 operated by the gate is out of engagement with the spring 34. This as before described results in the valve 44 in the gas supply to the burner remaining open. Control by the safety pilot 50, thermostat 51, etc., is likewise delayed in action. A manually controlled switch 56 is disposed in the circuit 37 for throwing the electrical control means into and out of operation.

I have illustrated and described my invention in embodiments which I have found very practical. I have not attempted to illustrate or describe other embodiments or adaptations as it is believed this disclosure will enable those skilled in the art to embody or adapt my invention as may be desired.

Having thus described my invention, what I claim as new and desire to secure by Letters Patent is:

1. In a draft regulator and burner control, a housing having an opening to the outside atmosphere, a pivotally mounted control gate for said opening, said gate being disposed to open outwardly during a down draft and disposed to open inwardly during an updraft, a first electrical circuit, a switch in said circuit, said switch being supported by said housing separately from said gate, said switch being normally open when the gate is closed and in an inward position due to an updraft, means for opening and closing said switch, said means including a spring embodied in said switch to open the switch and then to hold the same opened when the gate is in an inwardly opened position due to an updraft and including a member connected to and movable as a unit with said gate to close said switch against the stress of said spring and then to hold the same closed when the gate is in an outwardly opened position due to a down draft, a second electrical circuit, a switch normally closed in said second circuit, means for opening the switch in said second circuit a substantial interval after closing the switch in said first circuit, said switch opening means including a coil in said first circuit, a valve normally closed for controlling the supply of fuel to a burner, means in said second circuit for holding said valve open when the switch of said second circuit is closed and permitting closing of said valve when the switch of said circuit is opened by said switch opening means of said first circuit.

2. In combination, a housing having an opening to the outside atmosphere, a pivotally mounted control gate for said opening, said gate being disposed to open outwardly during a down draft for passage of gases from a flue, through the housing and then to the outside atmosphere and disposed to open inwardly during an updraft for passage of air outside the housing, through the housing and then into a flue, a first circuit, a switch in said circuit, means for operating said switch, said means including means embodied in the switch for opening said switch and then holding the same open when the gate is in an inwardly opened position due to an updraft and including a member connected to and movable as a unit with the gate for closing said switch and then holding the same closed when the gate is in an outwardly opened position due to a downdraft, a second circuit, a switch in said second circuit, means in said first circuit for controlling the switch of the second circuit, said switch controlling means including a heating element in the first circuit and including a thermostatic element adjacent the heating element to be operated thereby for delaying the operation of the switch of the second circuit for a substantial period after operation of the switch of the first circuit, and burner control means controlled by said second circuit for shutting off a burner when the gate is opened outwardly for a substantial interval due to a downdraft.

3. In a barometric draft regulator and burner control, an open ended gate housing, a pivotally mounted control gate disposed in said housing for opening inwardly during an up draft and outwardly during a down draft, a first electrical circuit, a switch open in said circuit when the gate is closed and in an inward position due to an updraft, said switch being supported by said housing separately from said gate, means disposed relative to said gate and switch and operable by said gate to close said switch when the gate swings outwardly due to a downdraft, said means being disposed relative to said gate and switch to be in inoperative relation to said switch when the gate moves inwardly of the housing due to an updraft whereby the switch is in open position when the gate is in an inward position due to an updraft, a heating coil in said circuit, a thermostatic element disposed centrally of said coil to be heated thereby, a second electrical circuit, a switch normally closed in said second circuit, said switch being disposed to be opened by said thermostatic element when heated by said coil, a valve for controlling the supply of gas to a burner, a solenoid in said second circuit disposed to hold said valve open when the switch in said second circuit is closed, and means disposed to close said valve when the switch in said second circuit is opened by said thermostatic element.

4. In a draft regulator and burner control, an open ended gate housing, a pivotally mounted control gate disposed in said housing for opening inwardly during an up draft and outwardly during a down draft, a first electrical circuit, a switch open in said circuit when the gate is closed and in an inward position due to an updraft, said switch being supported by said housing separately from said gate, means disposed relative to said gate and switch and operable by said gate for closing said switch when the gate opens outwardly due to a downdraft, said means being disposed relative to said gate and switch to be in inoperative relation to said switch when the gate moves inwardly of the housing due to an updraft whereby the switch is in open position when the gate is in an inward position due to an updraft, a heating coil in said circuit, a thermostatic element disposed adjacent said coil to be heated thereby, a second electrical circuit, a switch normally closed in said second circuit, said switch being disposed to be opened by said thermostatic element when heated by said coil, a valve for controlling the supply of gas to a burner, means operable by said second circuit for holding said valve open when the switch of said second circuit is closed and means for closing said valve when the switch of said second circuit is opened by said thermostatic element.

5. In a draft regulator and burner control, an open ended gate housing, a pivotally mounted control gate disposed in said housing for opening inwardly during an up draft and outwardly during a down draft, a first electrical circuit, a switch in said circuit, means for opening and closing said switch, including means disposed relative to said gate and switch and operable by said gate to open the switch when the gate swings outwardly due to a downdraft, said means being disposed relative to said gate and switch to be in inoperative relation to said switch when the gate moves inwardly of the housing due to an updraft whereby the switch is in open position when the gate is in an inward position due to an updraft, a heating coil in said circuit, a thermostatic element adjacent said coil to be heated thereby, a second circuit, a switch normally closed in said second circuit, said switch being disposed to be opened by said thermostatic element when heated by said coil, a valve normally closed for controlling the supply of fuel to a burner, means in said second circuit for holding said valve open when the switch of said second circuit is closed and permitting said valve to close when the switch of said second circuit is opened by said thermostatic element.

6. In a draft regulator and burner control, an open ended gate housing, a pivotally mounted control gate in said housing for opening inwardly during an up draft and outwardly during a down draft, a first electrical circuit, a switch open in said circuit when the gate is closed and in an inward position due to an updraft, said switch being supported by said housing separately from said gate, means for closing said switch disposed relative to said gate and switch and operable by said gate when said gate opens outwardly due to a down draft, said means being disposed relative to said gate and switch to be in inoperative relation to said switch when the gate moves inwardly of the housing due to an updraft whereby the switch is in an open position when the gate is in an inward position due to an updraft, a second electrical circuit, a switch normally closed in said second circuit, means for opening the switch in said second circuit a substantial interval after closing the switch in said first circuit, said switch opening means including a coil in the first circuit, a valve normally closed for controlling the supply of fuel to a burner, means in said second circuit for holding said valve open when the switch of said second circuit is closed and permitting closing of the valve when the switch of said second circuit is opened by said switch opening means of said first circuit.

7. In a draft regulator and burner control, an open ended gate housing, a pivotally mounted control gate disposed in said housing for opening inwardly during an up draft and opening outwardly during a down draft, electrical connections, a switch open in said electrical connections when the gate is closed and in an inward position due to an updraft, said switch being supported on said housing separate from said gate, means for closing said switch operable by said gate when the gate opens outwardly due to a down draft, said means being disposed relative to said gate and switch to be in inoperative relation to said switch when the gate moves inwardly of the housing due to an updraft whereby said switch is in an open position when the gate is closed and in an inward position due to an updraft, a valve normally closed for controlling the supply of fuel to a burner, means for opening said valve including means operable by said electrical connections when said switch is open, said last named means permitting closing of said valve when said switch is closed by outward opening movement of the gate due to a down draft.

8. In a draft regulator and burner control, an open ended gate housing, a pivotally mounted control gate for said housing disposed to open inwardly during an updraft to an inwardly opened position for passage of air outside the housing, through the housing and into a flue, and disposed to open outwardly during a down draft to an outwardly opened position for passage of gases from a flue, through the housing and then to the outside atmosphere, a valve for controlling the fuel supply to a burner, and means including electrical connections disposed relative to said gate to be controlled thereby during the swinging movements thereof for opening and closing said valve, said valve being closed when the gate has swung outwardly due to a down draft and open when said gate is swung inwardly due to an updraft, the swinging gate and the electrical connections of said means being relatively disposed during the swinging movements of the gate both inwardly and upwardly of the housing for closure of the valve when the gate is in an outward position due to a down draft and for the valve to be in an open position in all positions of the gate when opened inwardly due to an updraft, said means and the electrical connections thereof for opening and closing said valve including a switch and means for operating said switch for opening the same and then holding the same open when the gate is in one of said opened positions and for closing said switch and then holding the same closed when the gate is in the other of said opened positions, said means for operating said switch including a member connected to and movable as a unit with said gate during its movements between said inwardly and outwardly opened positions thereof.

References Cited in the file of this patent

UNITED STATES PATENTS

| Number | Name | Date |
|---|---|---|
| 1,963,073 | Butler | June 19, 1934 |
| 2,086,617 | Hiner | July 13, 1937 |
| 2,088,299 | Macrae | July 27, 1937 |
| 2,112,554 | Beam | Mar. 29, 1938 |
| 2,130,491 | Gilliland | Sept. 20, 1938 |
| 2,197,746 | Matthes | Apr. 16, 1940 |
| 2,225,237 | Shaw | Dec. 17, 1940 |
| 2,237,041 | Schreuder | Apr. 1, 1941 |